United States Patent
Melpignano et al.

(10) Patent No.: US 8,000,715 B2
(45) Date of Patent: Aug. 16, 2011

(54) METHOD AND SYSTEM FOR DYNAMIC SPECTRUM ALLOCATION, AND COMPUTER PROGRAM PRODUCT THEREFOR

(75) Inventors: Diego Melpignano, Monza (IT); Petri H. Mähönen, Aachen (DE)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 706 days.

(21) Appl. No.: 11/462,197

(22) Filed: Aug. 3, 2006

(65) Prior Publication Data

US 2010/0238868 A1    Sep. 23, 2010

(30) Foreign Application Priority Data

Aug. 4, 2005    (EP) .................................... 05016951

(51) Int. Cl.
*H04W 72/00*    (2009.01)
(52) U.S. Cl. .................. 455/451; 455/452.1; 455/452.2; 455/454; 370/329; 370/328; 370/338
(58) Field of Classification Search .......... 455/450–454; 370/310–350
See application file for complete search history.

(56) References Cited

U.S. PATENT DOCUMENTS

| | | | | |
|---|---|---|---|---|
| 5,276,730 | A * | 1/1994 | Cimini et al. | 455/452.1 |
| 6,546,248 | B1 * | 4/2003 | Jou et al. | 455/434 |
| 2004/0047324 | A1 * | 3/2004 | Diener | 370/338 |
| 2004/0082335 | A1 | 4/2004 | Hirayama et al. | 455/450 |
| 2004/0142697 | A1 * | 7/2004 | Knaebchen et al. | 455/452.1 |
| 2005/0128971 | A1 | 6/2005 | Huschke et al. | 370/328 |
| 2006/0083205 | A1 * | 4/2006 | Buddhikot et al. | 370/338 |
| 2006/0104232 | A1 * | 5/2006 | Gidwani | 370/328 |
| 2006/0148482 | A1 * | 7/2006 | Mangold | 455/450 |

FOREIGN PATENT DOCUMENTS

WO    02/073366    9/2002

* cited by examiner

*Primary Examiner* — Kamran Afshar
*Assistant Examiner* — Kathy Wang-Hurst
(74) *Attorney, Agent, or Firm* — Lisa K. Jorgenson; Allen, Dyer, Doppelt, Milbrath & Gilchrist, P.A.

(57) ABSTRACT

A communication network such as a cellular network or a WLAN includes a set of user terminals. Within the communication network, a system dynamically controls spectrum usage. The system includes a functionality sensor for sensing spectrum usage within the area covered by the communication network, and a policy server for producing, as a function of the sensed spectrum usage, spectrum usage policies for the communication network. A broadcasting arrangement broadcasts the spectrum usage policies to the user terminals. The system is applicable to cognitive radio systems.

36 Claims, 2 Drawing Sheets

METHOD AND SYSTEM FOR DYNAMIC SPECTRUM ALLOCATION, AND COMPUTER PROGRAM PRODUCT THEREFOR

FIELD OF THE INVENTION

The present invention relates to techniques for dynamic spectrum allocation, and more particularly, application of these techniques in wireless communication networks and specifically to cognitive radio systems.

BACKGROUND OF THE INVENTION

Frequency spectrum usage for wireless communications is in most instances statically allocated to individual services (e.g., TV stations, radar, and police enforcement) by regulatory bodies. As a result of such static spectrum allocation many frequency bands are under-exploited both in time and in space.

Current worldwide research is defining a framework to allow devices to temporarily and dynamically use such under-exploited frequency bands without harming licensed users. Spectrum allocation and usage policies allowed should be delivered, i.e. made available, with spectrum agile radios to prevent uncontrolled terminal behavior. Recently, a new wireless research area has emerged, referred to as cognitive radio as described in J. Mitola, "Software Radio-Cognitive Radio, Wireless Architectures for the 21st Century", as disclosed at http://ourworld.compuserve.com/homepages/jmitola.

A cognitive radio (CR) is able to sense the frequency spectrum and use bands that are not being utilized by their licensed primary users. In so doing, a cognitive radio should minimize interference with its neighbors and, most importantly, should make sure to render the frequency band immediately free and available to such primary users as soon as they re-appear.

This research area is now being endorsed by regulatory bodies, like the U.S. Federal Communications Commission (FCC) that started investigating the consequences of such changes in the spectrum usage. Specific programs have been started, for example by the Defense Advanced Research Projects Agency (DARPA), with the aim of creating the technological and normative conditions that enable dynamic spectrum allocation and usage by frequency-agile terminals.

Cognitive radio concepts are thus moving out of a pure research field and are being endorsed by regulatory and standardization bodies. For instance, in the US some old analog TV bands are being made available for experimentation of frequency-agile systems, and IEEE802.22 is developing suitable protocols to specify cognitive radio behavior in those frequencies. Another area of potential application is Wireless-LAN, where frequency agile behavior according to a cognitive radio paradigm may take place within the ISM band.

Specifically, a spectrum allocation policy language is being defined by the DARPA XG Working Group, "XG Policy Language Framework", version 1.0, April 2004 to describe the terms dictated by a regulator for dynamic frequency access that mobile terminals should abide. By means of this language, wireless terminals receive a description of the bands which can be (temporarily) used, and the conditions for such usages. Rules may change depending on both physical location and time.

Recently, IEEE has also started work at standardizing the basic parameters related to the deployment of spectrum agile systems in frequency bands previously allocated to analog TV stations, as in IEEE P802.22, "Standard for Wireless Regional Area Networks (WRAN)-Specific requirements-Part 22: Cognitive Wireless RAN Medium Access Control (MAC) and Physical Layer (PHY) Specifications: Policies and Procedures for Operation in the TV Bands."

U.S. published patent application no. 2004/0092281 describes an approach that increases the available spectrum in a wireless network by sharing existing allocated (and in-use) portions of the radio frequency (RF) spectrum in a manner that will minimize the probability of interfering with existing legacy users. The approach described in this document provides interference adaptive waveforms, and a variety of physical and media access control protocols for generating waveforms based on measurement and characterization of the local spectrum.

This prior approach measures the local spectrum at a receiving node, generates an optimal waveform profile specifying transmission parameters that will water-fill the unused spectrum up to an interference limit without causing harmful interference to primary and legacy transmitters using the same frequency bands, and enables simultaneous transmit and receive modes at a multiplicity of transceivers in a wireless network. The related arrangement also provides closed loop feedback control between nodes, co-site interference management, intersymbol interference mitigation, wide sense stationary base-band signaling and modulation, and power limited signaling for avoiding detection and interception.

U.S. published patent application 2004/0047324 describes a system and a method for managing communication with a plurality of wireless client devices operating in a radio frequency band shared by other types of devices. The managing comprises controlling at least one parameter associated with radio communication with each of the plurality of wireless devices based on the radio frequency environment associated with each corresponding one of the plurality of wireless client devices. Spectrum profile information describing the radio frequency environment (activity in the frequency band) at a wireless client device is sent to the wireless base station device (where the parameter controls are made) from either a wireless client device or another radio device in the proximity of one or more wireless client devices that is capable of generating the spectrum profile information.

The spectrum profile information may include information identifying signals that are occurring in the frequency band in the proximity of a wireless client device. Examples of parameters that may be controlled at the wireless base station device include packet fragmentation threshold (the length of a data packet), transmission data rate and transmission scheduling (synchronizing a transmission to quiescent intervals of one or more periodic interfering signals).

U.S. patent application no. 2004/0171390 describes classes of cognition models which may include radio environment models, mobility models, and application/user context models. These models are utilized in a wireless communications network. Radio environment models represent the physical aspects of the radio environment, such as shadowing losses, multi-path propagation, interference and noise levels, etc. Mobility models represent users motion in terms of geo-coordinates and/or logical identifiers, such as street names, as well as speed of a user terminal. The context model represents the present state and dynamics of each of these application processes within itself and between multiple application processes. These data are employed to optimize network performance.

SUMMARY OF THE INVENTION

From the foregoing description of the current situation, there exists the need to define approaches for treating dynamic spectrum allocation in a wireless telecommunications network in a more satisfactory way as compared to the approaches according to the known art described previously.

More specifically, there is a need to properly define arrangements within spectrum policies while avoiding individual radios that may operate only according to their spectrum sensing results. Different wireless terminals may build spectrum profiles that are properly related to rules governing the usage of the spectrum. Well defined rules to access the spectrum may be distributed to the wireless terminals in a secure way.

An object of the invention is thus to provide a fully satisfactory response to this need. The invention also relates to a corresponding system, as well as to a related network, and a computer program product loadable in the memory of at least one computer and including software code portions for performing the steps of the method when the product is run on the computer.

As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The approach described herein provides a new scheme to broadcast policy information using the cellular network infrastructure managed by operators. The main advantages of such an approach is that the spectrum allocation policy is local to the cell, and information sent by the cellular operator can be trusted by wireless terminals.

Essentially, the preferred embodiment of the approach described herein moves from a static to a dynamic spectrum sharing arrangement involving a new radio technology, a new regulatory framework and new business models. Essentially, a framework equivalent to the one described in DARPA XG Working Group, "XG Policy Language Framework", version 1.0, April 2004, is assumed to be in place. According to the XG model, the spectrum usage policies (SUP) are expressed in a machine-readable format, such as the XG policy language (XGPL). Wireless terminals receive such information, parse it and operate according to the authorized use described therein. Radios that can support this functionality are called policy agile radios (PAR). Policy agile radios are usually also frequency agile radios, i.e., based on policy information and they can operate on different frequency bands.

Given the sensitivity of spectrum usage policies information, a security problem is easily identified. Consequently, an entity is preferably provided that ensures the correctness and secure delivery of the spectrum policy information to the wireless terminals. Since spectrum usage considerably varies with the geographical position, the spectrum usage policies are made applicable in a well-defined area.

The approach described herein proposes that cellular operators insert digitally signed spectrum usage policies in the broadcast channel of a cell. Equivalently, any other entity that owns a wireless infrastructure can apply the same mechanism. The broadcast functionality may be implemented in different ways, depending on the standard adopted: either IP-based broadcast, IP multicast or non-IP based addressing may be used to convey the same message to subscribers in a cell.

The approach described herein may be used for example, in 2G (i.e., second generation) systems like GSM/GPRS/EDGE, and 3G systems and their evolutions (UMTS/WCDMA with HSDPA enhancements), IEEE802.16 or IEEE802.20 (WiMax), IEEE802.11 and Bluetooth. In general, the approach described herein is applicable to any system where a wireless broadcast channel is supported, and where access points belong to an organization. Such an organization should be both responsible for the correctness of the spectrum usage information, and should be trusted by mobile terminals.

The arrangement described herein provides the following advantages. Security identity module SIM-based authentication and digitally signed certificates are used to ensure that the spectrum usage policies are securely delivered to authorized users, and that users can trust information coming from the operator. The cellular operator gives the necessary guarantees that the spectrum usage policy information is correct. Since the spectrum usage policy scope is the broadcast cell, geographical locations can be taken into account and different spectrum usage policy can be used in the various cells managed by the operator.

BRIEF DESCRIPTION OF THE DRAWINGS

The invention will now be described, by way of example only, with reference to the enclosed figures, wherein.

DETAILED DESCRIPTION OF THE PREFERRED EMBODIMENTS

Figure 1:
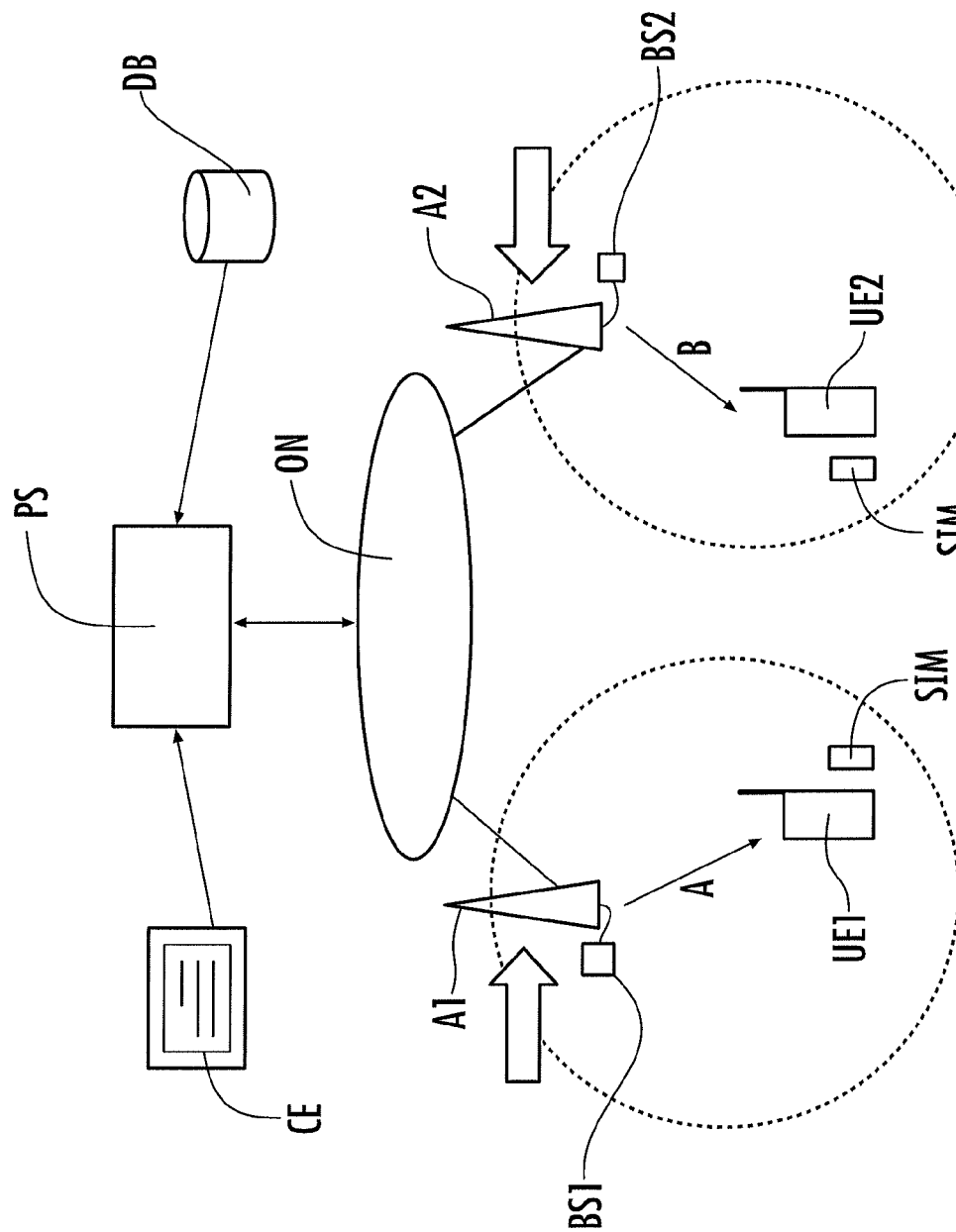
FIG. 1 shows an example of a network architecture in accordance with the present invention based on the arrangement described herein.

The functional block diagram shown in FIG. 1 is schematically representative of a communication network including two base stations BS1 and BS2 that are part of a (larger) operator network ON that manages (i.e., controls) spectrum usage policies via a policy server PS. These policies can be certified by the network operator using digital certificates CE.

In the exemplary arrangement shown, the base stations BS1 and BS2 are configured to sense, through antennas A1 and A2 respectively, the local spectrum usage by scanning specific bands. The base stations BS1 and BS2 are thus in a position to provide to the policy server PS detailed information concerning what bands are currently exploited in the geographical area covered by the sensing action.

Scan results are reported back to the policy server PS or any dedicated server in the core network in the network ON. This server is configured to develop specific policies for each cell, based on scan results and general policy information coming from regulatory bodies. These policies may be developed on the basis of known principles (see e.g., the introductory portion of the description), and the process of developing such policies does not form by itself specific subject-matter of this application, which makes it unnecessary to provide a more detailed description herein.

Once spectrum usage policies are ready, they are digitally signed and sent to each base station BS1, BS2, . . . in the network ON, where they are periodically broadcast to all users UE1, UE2 in the cell. Spectrum usage policy information can be marked as valid only for a specific time interval so that terminals can cache such information on some local storage.

Preferably, user terminals UE1, UE2 in the cell receive and verify any spectrum usage policy before trying to use any frequency band. In other words, the mobile terminals first get access to the operator network ON before they can transition to other frequency bands. This ensures that spectrum usage policy information is always updated, as this may change over time.

Base stations BS1, BS2 . . . as described herein include a spectrum sensing capability. They may thus monitor the behavior of wireless terminals UE1, UE2, . . . to check for potential rule violations in access of the spectrum. If misbehaving terminals are identified, they can be blocked by the operator, which ensures that any such terminal can no longer access the operator's network ON, which is a condition that is verified before other frequency bands can be used by the terminal. The operator can then check the reason for the incorrect usage of the spectrum and take the necessary actions.

Preferably, also mobile terminals UE1, UE2 themselves are configured to sense/measure local frequency usage and report such information back to the base stations BS1, BS2. Such sensing can be achieved resorting to relatively simple extension of the field sensing features currently included in such mobile terminals as a basis for proper connection to the best server cell and cell handover processes. Sensing/measuring local frequency usage by the mobile terminals UE1, UE2 ensures a more precise snapshot of the spectrum usage.

The approach described may thus impact both on the wireless network infrastructure and on the configuration frequency/policy agile mobile terminals. In regards to the infrastructure part, cellular operators (or any other entity that is responsible for wide/local area wireless access) may maintain and distribute spectrum usage policy information through base stations or access points. This approach is also applicable to wireless-LANs, both in private and public places (such as hotspots). Worldwide interoperability for microwave access (WiMAX) is another example of technology that could be used in the infrastructure.

In regards to the client terminals/devices, the arrangement described herein relies on terminals that are frequency agile (i.e., can work on multiple radio bands), and that are able to interpret spectrum policy usage coded using the standard XGPL language or any other equivalent means. The implementation therefore typically includes a software agent in the mobile terminals that is responsible for parsing coded spectrum usage policy information and interpreting it; verifying spectrum usage policy information integrity by way of standard mechanisms (certificates, digital signatures, hashing functions, and controlling the behavior of the spectrum agile radio according to information included in the received spectrum usage policy.

While at the time this application is filed cognitive radio in the general sense is still to be fully developed and adopted extensively, due to the required regulatory changes, the arrangement described herein is already applicable to achieve frequency agility inside specific radio bands. One example is the wireless LAN case, such as a WLAN system using the ISM bands (2.4 and 5 GHz, respectively).

Wireless-LAN access points with added spectrum sensing capabilities can collect information about traffic patterns of associated mobile stations. Such measurements (after suitable post-processing), coupled with local spectrum usage policies may be coded by a central server into a spectrum usage policy document. After this step, the spectrum usage policy may be digitally signed for example by certificates. The central server then periodically broadcasts the digitally signed spectrum usage policy to all access points, using, for example, IP broadcast or IP multicast or, more simply, a broadcast Medium Access Control (MAC) address. Upon receiving the spectrum usage policy from the central server access points relay such information to wireless-LAN mobile stations in their coverage area.

The role of wireless-LAN terminals in this system architecture is twofold. On the one hand, wireless-LAN terminals themselves can measure how frequency channels are being used in the cell and report such information towards the wireless-LAN access point by protocols such as those being developed by IEEE802.11k. This step addresses for example, the hidden node problem, which is well known in the literature.

On the other hand, wireless-LAN terminals that receive spectrum usage policy information may decide to switch to less- or least-occupied frequency channels in order to reduce interference, and have more bandwidth available for their communication. In this case, two situations may occur: either 1) the wireless-LAN terminal wishes to communicate towards the fixed LAN (behind the access point), or 2) it wishes to communicate with another wireless-LAN terminal in range.

In the former case, situations may arise where the same physical area is covered by multiple access points operating on non-overlapping channels (or, equivalently, by one multi-radio access point). The Wireless-LAN terminal may then decide to dynamically re-associate with the most convenient access point, i.e., use a different frequency band characterized by less traffic intensity.

Figure 2:
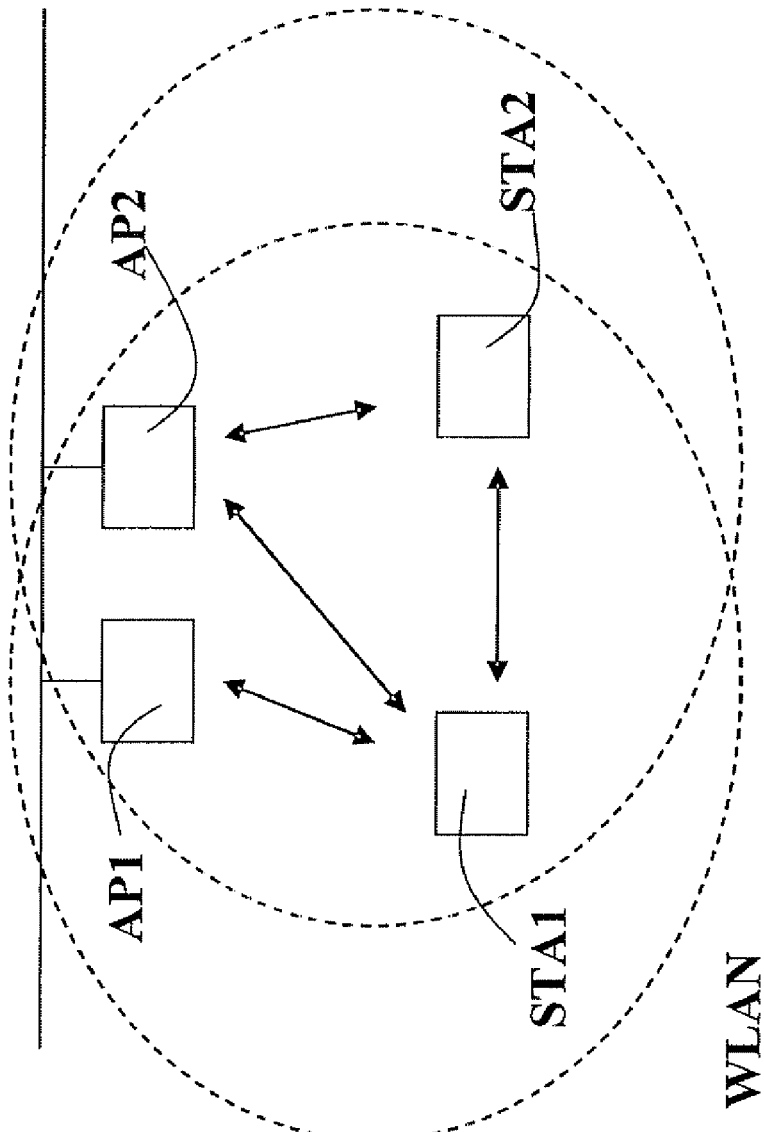
FIG. 2 shows an example broadcast of the spectrum usage policy information in accordance with the present invention.

Referring to FIG. 2, a mobile station STA1 is currently connected to an access point AP1, but the cell is congested due to many other mobile stations being connected to the access point AP1. By receiving spectrum usage policy information, the mobile station STA1 re-associates with the access point AP2, which is operating in a different frequency, but still in the wireless-LAN ISM band. In this case, the network infrastructure uses spectrum usage policy information to perform load-balancing among overlapping wireless-LAN cells.

In the latter case, i.e., specific communication among terminals, the mobile stations wishing to communicate among themselves may decide to temporarily leave the infrastructure mode (i.e., the association with a wireless-LAN access point) and use an ad-hoc mode with a frequency channel suggested by the access point by way of the spectrum usage policy. Referring to FIG. 2, the mobile station STA1 is initially associated with the access point AP1, whereas the mobile station STA2 is associated with the access point AP2. By way of spectrum usage policy information broadcast by the access points, the mobile stations STA1 and STA2 that wish to communicate between themselves both leave infrastructure mode and connect directly using ad-hoc mode. In the latter case a dedicated signaling protocol among wireless-LAN stations is used.

In that respect, those skilled in the art will appreciate that the arrangement described herein solves the problem of increasing interference between badly-configured WLAN systems. The arrangement described herein proposes a system that ensures a secure and optimized behavior of cognitive radio terminals. This result may be achieved through a cellular operator or any equivalent entity managing wireless access, which broadcasts policies for accessing the radio spectrum to frequency and policy agile mobile terminals.

Consequently, without prejudice to the underlying principles of the invention, the details and the embodiments may vary, also appreciably, with reference to what has been described by way of example only, without departing from the scope of the invention as defined by the annexed claims.

That which is claimed:

1. A method of dynamically controlling spectrum usage in a communication network including a plurality of user terminals and at least one base station communicating with the plurality of user terminals, the method comprising:

using the at least one base station and the plurality of user terminals to sense spectrum usage within an area covered by the communication network;

using the at least one base station to generate spectrum usage policies for the communication network based upon the sensed spectrum usage;

using the at least one base station to broadcast and digitally sign the generated spectrum usage policies to the plurality of user terminals; and using the at least one base station to monitor usage of the spectrum by the plurality of user terminals, to detect violations of the generated spectrum usage policies, and to block user terminals violating the generated spectrum usage policies, each respective user terminal configured to also monitor usage of the spectrum by other user terminals to detect violations of the generated spectrum usage policies.

2. The method of claim 1, wherein the communication network is configured as a cellular communication network; and wherein generating the spectrum usage policies comprises generating specific spectrum usage policies for each cell in the cellular communication network, with the specific spectrum usage policies for each cell being broadcast to the user terminals served by the respective cell.

3. The method of claim 1, wherein the communication network is configured as a cellular communication network; and wherein broadcasting the spectrum usage policies comprises sending the spectrum usage policies to the at least one base station to be broadcast to the user terminals in a respective cell in the cellular communication network.

4. The method of claim 1, wherein the generated spectrum usage policies are also based upon regulatory policy information.

5. The method of claim 1, further comprising marking the generated spectrum usage policies as valid only for a specific time interval.

6. The method of claim 1, further comprising caching the generated spectrum usage policies with the plurality of user terminals.

7. The method of claim 1, further comprising each respective user terminal verifying the generated spectrum usage policies broadcast thereto before using any frequency band conforming to the generated spectrum usage policies.

8. The method of claim 1, further comprising the plurality of user terminals accessing the communication network before selecting a frequency band conforming to the generated spectrum usage policies.

9. The method of claim 1, wherein the communication network is configured as a WLAN comprising at least one access point that determines the spectrum usage within an area covered by the WLAN; and wherein determining the spectrum usage is performed by the at least one access point.

10. The method of claim 9, further comprising broadcasting the generated spectrum usage policies to the at least one access point.

11. The method of claim 10, wherein the generated spectrum usage policies are broadcast to the at least one access point by at least one of an IP broadcast, an IP multicast, and a broadcast MAC address.

12. A system for dynamically controlling spectrum usage in a communication network including a plurality of user terminals and at least one base station communicating with the plurality of user terminals, the system comprising:

a functionality sensor configured to sense spectrum usage within an area covered by the communication network;

a policy server configured to generate spectrum usage policies for the communication network based upon the sensed spectrum usage; and a broadcaster configured to broadcast the generated spectrum usage policies to the plurality of user terminals;

said policy server configured to digitally sign the spectrum usage policies for broadcast to the plurality of user terminals, to monitor usage of the spectrum by the plurality of user terminals, to detect violations of the generated spectrum usage policies, and to block user terminals violating the generated spectrum usage policies, each respective user terminal configured to also monitor usage of the spectrum by other user terminals to detect violations of the generated spectrum usage policies.

13. The system of claim 12, wherein the communication network is configured as a cellular communication network; wherein said policy server is configured to generate the spectrum usage policies for each cell in the cellular communication network; and wherein said broadcaster is configured to broadcast the specific spectrum usage policies to the user terminals served by each respective cell.

14. The system of claim 12, wherein the communication network is configured as a cellular communication network; and wherein said at least one base station receives the generated spectrum usage policies, and also broadcasts the generated spectrum usage policies to the user terminals in a respective cell in the cellular communication network.

15. The system of claim 12, wherein said functionality sensor comprises at least one of the plurality of user terminals.

16. The system of claim 12, wherein the spectrum usage policies generated by said policy server are also based upon regulatory policy information.

17. The system of claim 12, wherein said policy server is configured to mark the generated spectrum usage policies as valid only for a specific time interval.

18. The system of claim 12, wherein each user terminal comprises a cache memory for caching the generated spectrum usage policies.

19. The system of claim 12, wherein each user terminal is configured to verify the generated spectrum usage policies broadcast thereto before using a frequency band conforming to the generated spectrum usage policies.

20. The system of claim 12, wherein each user terminal is configured to access the communication network before transitioning to a frequency band conforming to the generated spectrum usage policies.

21. The system of claim 12, wherein said functionality sensor is configured to monitor usage of the spectrum by the user terminals to detect violations of the generated spectrum usage policies.

22. The system of claim 12, wherein the communication network is configured as a WLAN; and wherein said functionality sensor is configured as an access point operating in the WLAN.

23. The system of claim 22, wherein said broadcaster is configured to broadcast the generated spectrum usage policies to the access point.

24. The system of claim 23, wherein said broadcaster is configured to broadcast the generated spectrum usage policies to the access point via at least one of an IP broadcast, an IP multicast, and a broadcast MAC address.

25. A communication network comprising:

at least one functionality sensor configured to sense spectrum usage within an area covered by the communication network;

a policy server configured to generate spectrum usage policies for the communication network based upon the sensed spectrum usage, and to broadcast the generated spectrum usage policies; and a plurality of user terminals configured to operate within the communication network and to receive the generated spectrum usage policies broadcast by said policy sever;

said policy server being configured to digitally sign the spectrum usage policies to be broadcast to said plurality of user terminals, to monitor usage of the spectrum by the plurality of user terminals, to detect violations of the generated spectrum usage policies, and to block user terminals violating the generated spectrum usage policies, each respective user terminal also configured to monitor usage of the spectrum within the area covered by the communication network to detect violations of the generated spectrum usage policies.

26. The communication network of claim 25, wherein the communication network is configured as a cellular communication network; and wherein said at least one functionality sensor is configured as a base station.

27. The communication network of claim 25, wherein the communication network is configured as a WLAN; and wherein said at least one functionality sensor is configured as an access point.

28. The communication network of claim 25, wherein the spectrum usage policies generated by said policy server are also based upon regulatory policy information.

29. The communication network of claim 25, wherein said at least one functionality sensor is configured to monitor usage of the spectrum by each user terminal to detect violations of the generated spectrum usage policies.

30. A non-transitory computer-readable medium having computer-executable instructions for causing a computer to dynamically control spectrum usage in a communication network including a plurality of user terminals and at least one base station communicating with the plurality of user terminals by performing steps comprising:

using the at least one base station and the plurality of user terminals to sense spectrum usage within an area covered by the communication network including a plurality of user terminals;

using the at least one base station to generate spectrum usage policies for the communication network based upon the sensed spectrum usage;

using the at least one base station to broadcast and digitally sign the generated spectrum usage policies to the plurality of user terminals;

using the at least one base station and the plurality of user terminals to monitor usage of the spectrum by other user terminals and for detecting violations of the generated spectrum usage policies; and using the at least one base station to block user terminals violating the generated spectrum usage policies.

31. The non-transitory computer-readable medium of claim 30, wherein the communication network is configured as a cellular communication network; and wherein generating the spectrum usage policies comprises generating specific spectrum usage policies for each cell in the cellular communication network, with the specific spectrum usage policies for each cell being broadcast to the user terminals served by the respective cell.

32. The non-transitory computer-readable medium of claim 30, wherein the communication network is configured as a cellular communication network comprising at least one base station serving the plurality of user terminals; and wherein broadcasting the spectrum usage policies comprises sending the spectrum usage policies to the at least one base station to be broadcast to the user terminals in a respective cell in the cellular communication network.

33. The non-transitory computer-readable medium of claim 30, wherein the generated spectrum usage policies are also based upon regulatory policy information.

34. The non-transitory computer-readable medium of claim 30, further comprising marking the generated spectrum usage policies as valid only for a specific time interval.

35. The non-transitory computer-readable medium of claim 30, further comprising each respective user terminal verifying the generated spectrum usage policies broadcast thereto before using any frequency band conforming to the generated spectrum usage policies.

36. The non-transitory computer-readable medium of claim 30, wherein the communication network is configured as a WLAN comprising at least one access point that determines the spectrum usage within an area covered by the WLAN; and wherein determining the spectrum usage is performed by the at least one access point.

* * * * *